United States Patent
Lee et al.

(10) Patent No.: US 9,423,055 B2
(45) Date of Patent: Aug. 23, 2016

(54) SUPPORT AND DISPLAY DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Chun-Lang Lee, New Taipei (TW); Hai-Yan Huang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/528,401

(22) Filed: Oct. 30, 2014

(65) Prior Publication Data

US 2015/0313032 A1    Oct. 29, 2015

(30) Foreign Application Priority Data

Apr. 28, 2014   (CN) .......................... 2014 1 0173523

(51) Int. Cl.
*H05K 5/00* (2006.01)
*F16L 3/12* (2006.01)
*F16M 11/22* (2006.01)

(52) U.S. Cl.
CPC ............ *F16L 3/1218* (2013.01); *F16M 11/22* (2013.01); *F16M 2200/065* (2013.01); *F16M 2200/08* (2013.01)

(58) Field of Classification Search
CPC .... H05K 7/02; H05K 5/0247; H05K 5/0017; H05K 5/0234; H04N 5/64; F16L 3/26; F16L 3/1218; F16M 11/22; F16M 2200/065; F16M 2200/08
USPC ............ 361/679.05–679.07, 679.21, 679.22, 361/679.26, 679.41–679.45, 681, 682, 683; 248/917–923
See application file for complete search history.

(56) References Cited

U.S. PATENT DOCUMENTS

| | | | | |
|---|---|---|---|---|
| 5,978,211 A * | 11/1999 | Hong | ...................... | F16M 11/10 361/679.06 |
| 6,024,335 A * | 2/2000 | Min | ...................... | F16M 11/10 248/183.1 |
| 6,392,873 B1 * | 5/2002 | Honda | ...................... | G06F 1/16 248/419 |
| 7,145,767 B2 * | 12/2006 | Mache | ...................... | F16M 11/00 361/679.21 |
| 7,388,744 B2 * | 6/2008 | Chu | ...................... | G06F 1/1601 361/679.27 |
| 7,433,185 B1 * | 10/2008 | Curran | ...................... | F16M 11/00 361/679.41 |
| 8,634,188 B2 * | 1/2014 | Haren | ...................... | G06F 1/1632 361/679.41 |
| 2003/0235029 A1 * | 12/2003 | Doherty | ...................... | G06F 1/1632 361/679.27 |
| 2004/0047115 A1 * | 3/2004 | Helot | ...................... | F16M 11/06 361/679.06 |
| 2014/0085797 A1 * | 3/2014 | Cho | ...................... | G06F 1/1601 361/679.21 |

* cited by examiner

*Primary Examiner* — Hoa C Nguyen
*Assistant Examiner* — Sagar Shrestha
(74) *Attorney, Agent, or Firm* — ScienBiziP, P.C.

(57) ABSTRACT

A support for the display device includes a base portion, a stand portion, and a first bent portion between the base portion and the stand portion. The support further includes a wire passage defined through the base portion, the stand portion, and the first bent portion. One end of the wire passage can be connected to edges of the base portion, and define a first opening. The other end of the wire passage can be connected to a fastening end of the stand portion, and define a second opening coupled to the first opening. A plurality of the storage devices and power lines can be coupled to the first opening, so it is convenient to plug in or unplug the storage devices and power line. The present disclosure also provides a display device.

19 Claims, 6 Drawing Sheets

SUPPORT AND DISPLAY DEVICE USING THE SAME

FIELD

The subject matter herein generally relates to a display device, and particularly to a display device having a support.

BACKGROUND

Generally, a display device refers to monitors for devices, such as televisions or computers, that display a picture employing a cathode ray tube (CRT), a liquid crystal display (LCD), a plasma display panel (PDP) or a similar display device. For example, an LCD monitor includes a main body displaying the picture through an LCD panel, a base part supporting the main body, and a stand part provided between the main body and the base part.

BRIEF DESCRIPTION OF THE DRAWINGS

Implementations of the present technology will now be described, by way of example only, with reference to the attached figures.

DETAILED DESCRIPTION

Figure 1:
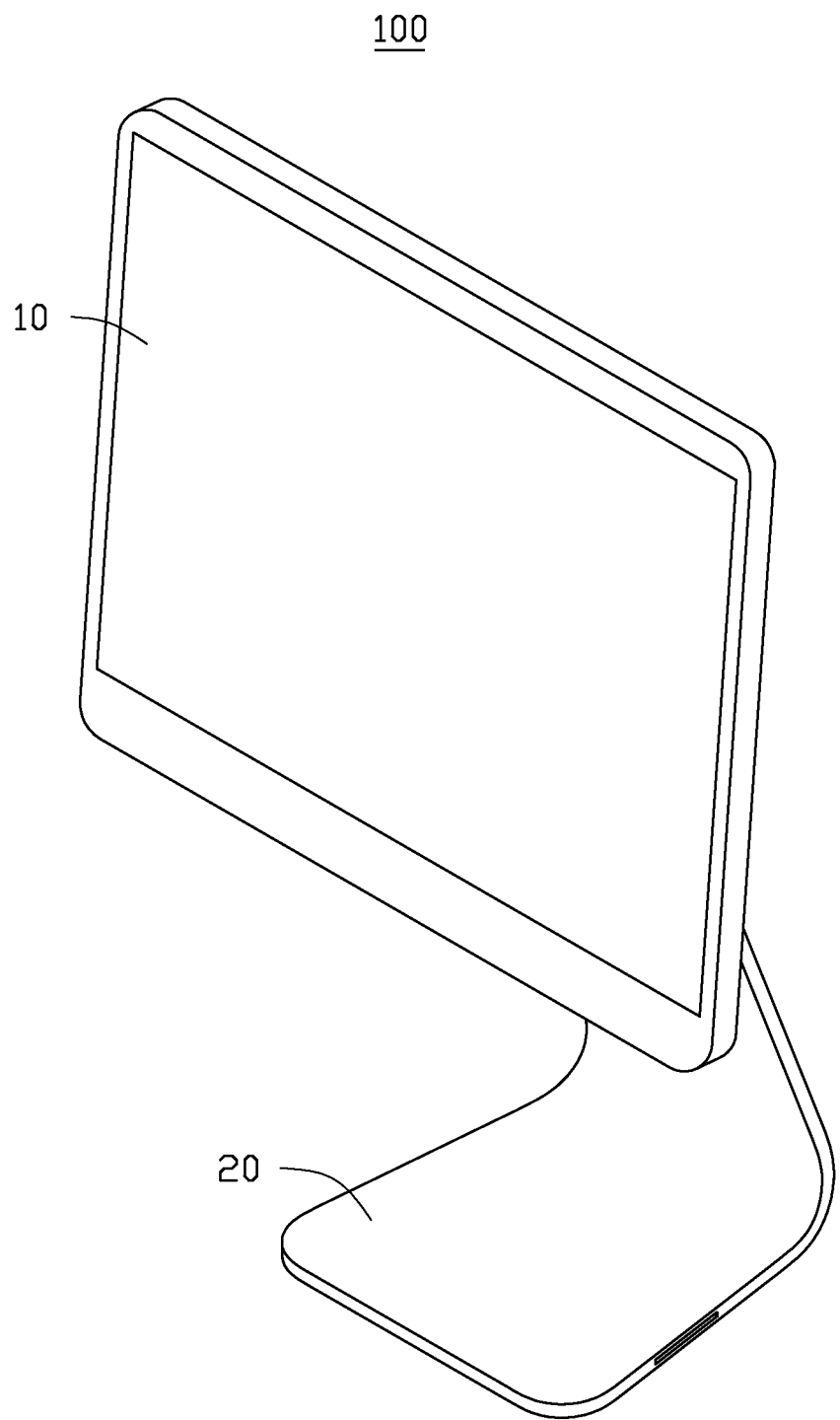
FIG. 1 is an isometric view of a first embodiment of a display device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising", when utilized, means "including, but not necessarily limited to"; it specifically indicates open-ended inclusion or membership in the so-described combination, group, series and the like.

The present disclosure is described in relation to a support and a display device using the support.

FIG. 1 illustrates an isometric view of an embodiment of a display device 100. The display device 100 can include a main body 10, and a support 20 configured to support the main body 10. In at least embodiment, the main body 10 can include a display panel (not shown) adapted to display an image.

Figure 2:
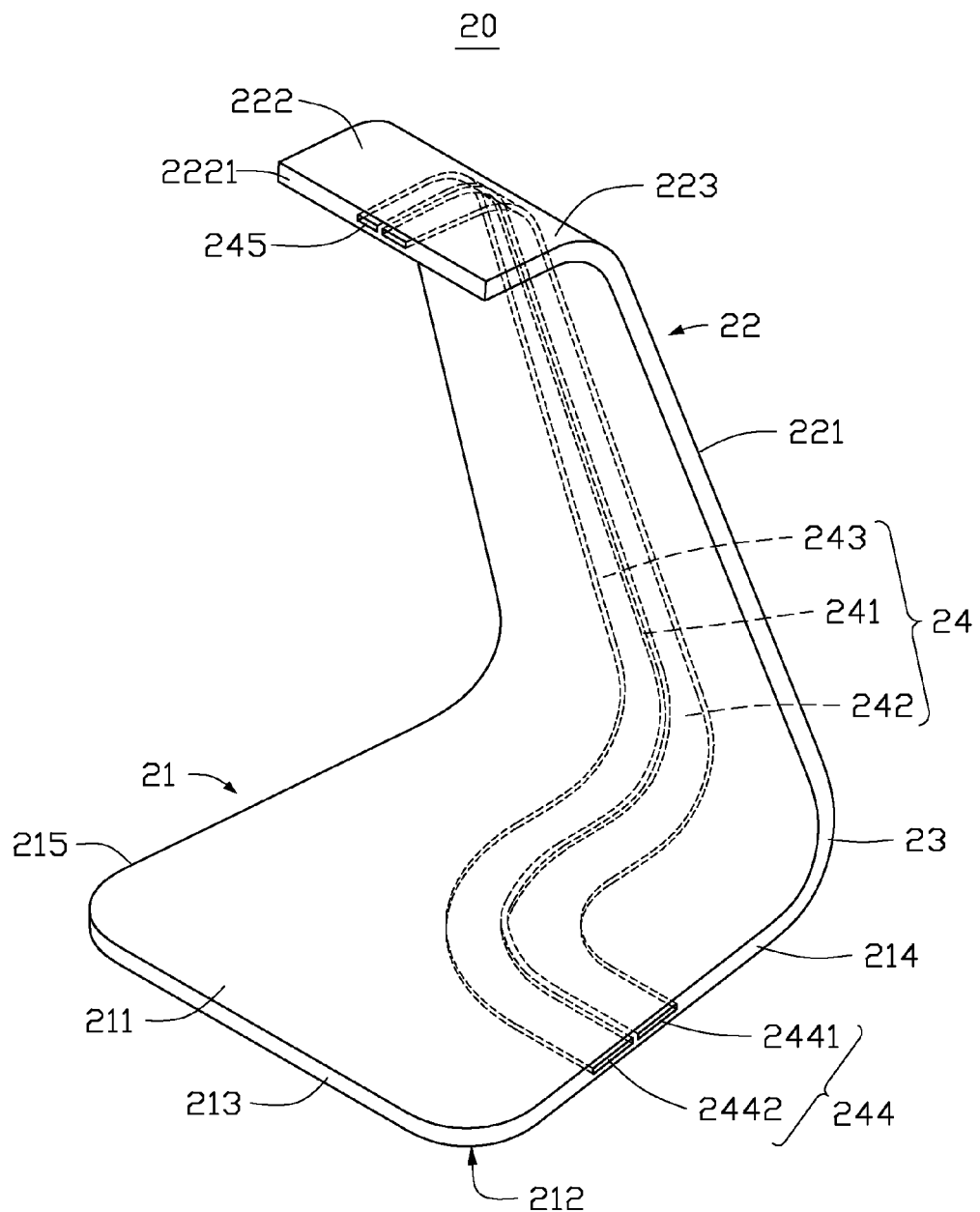
FIG. 2 is an isometric view of a support of the display device of FIG. 1.

FIG. 2 illustrates an isometric view of the support 20 of the display device 100. The support 20 can include a base portion 21, a stand portion 22, and a first bent portion 23 between the base portion 21 and the stand portion 22. An angle between the base portion 21 and the stand portion 22 can be acute angle or right angle. The first bent portion 23 can be substantially arc-shaped. In at least one embodiment, the base portion 21, the stand portion 22, and the first bent portion 23 can be formed by multiple bending and stamping of a metal board.

The base portion 21 can be substantially a trapezoidal plate, and include an upper surface 211, and a lower surface 212 opposite to the upper surface 211. The lower surface 212 can be coupled to a desk (not shown). The base portion 21 further includes three side walls between the upper surface 211 and the lower surface 212, a first side wall 213 can be opposite to the first bent portion 23, a second side wall 214 and a third side wall 215 can be respectively symmetrical, and arranged between the first bent portion 23 and the first side wall 213. In operation, a user can directly face the first side wall 213.

The stand portion 22 can include a supporting arm 221 connected to the first bent portion 23, a fastening portion 222, and a second bent portion 223 between the supporting arm 221 and the fastening portion 222. The supporting arm 221 and the fastening portion 222 can be substantially plates. The fastening portion 222 can include a fastening end 2221 away from the second bent portion 223, and the main body 10 can be connected to the fastening end 2221.

The support 20 further includes a wire passage 24 defined through the base portion 21, the first bent portion 23, and the stand portion 22. The wire passage 24 can be substantially L-shaped in the base portion 21, and can be substantially straight in the supporting arm 221. In operation, the wire passage 24 can be filled with a plurality of wires.

The wire passage 24 can include a first current slot 242 and a second current slot 243 separated from the first current slot 242 by a partition plate 241. The first current slot 242 can be configured to receive some high current wires having strong voltage or current, such as a power line. The second current slot 243 can be configured to receive some low current wires, such as a data cable. The partition plate 241 can separate the high current wires from the low current wires, which can decrease interference of magnetic field formed by the high current wires and the low current wires.

One end of the wire passage 24 can be connected to the second side wall 214 of the base portion 21, and define a first opening 244. The other end of the wire passage 24 can be connected to the fastening end 2221 of the fastening portion 222, and define a second opening 245. The width of the wire passage 24 can increase from the second opening 245 to the first opening 244. The first opening 244 can have a proper size, and can be configured to receive connectors (not shown). The second opening 245 can be engaged to a connection port (not shown) of the main body 10.

The first opening 244 can include a first portion 2441 corresponding to first current slot 243, and a second portion 2442 corresponding to second current slot 243. In at least one embodiment, the first portion 2441 can be configured to receive a power plug (not shown), and can be positioned away from the first side wall 213 and the user, which can avoid an electric shock. The second current slot 243 can be configured to receive the storage devices or USB plug, and the second current slot 243 is adjacent to the first side wall 213 and the user, so it is convenient to plug in or unplug the storage devices or USB plug.

In the illustrated embodiment, the first opening 244 and the second opening 245 can be substantially rectangular. The base portion 21 and the stand portion 22 can be substantially isosceles trapezoidal in shape. In other embodiments, the first opening 244 and the second opening 245 can be substantially triangular, circular, or other shapes. The base portion 21 and the stand portion 22 can be substantially rectangular, circular, fan-shaped, or other shapes.

Figure 3:
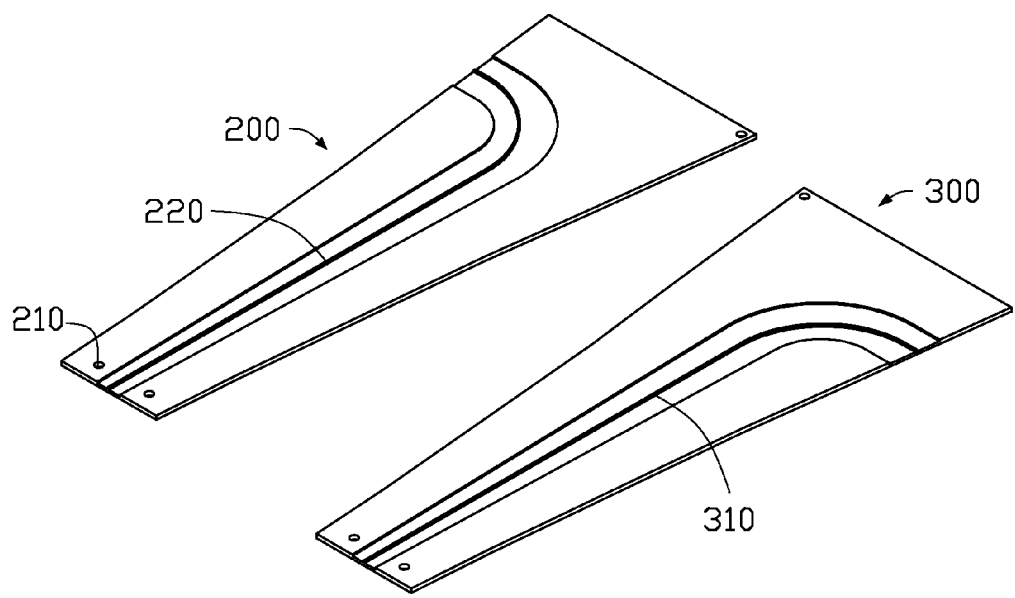
FIG. 3 is an isometric view of the first embodiment of a first metal plate and a second metal plate.
Figure 4:
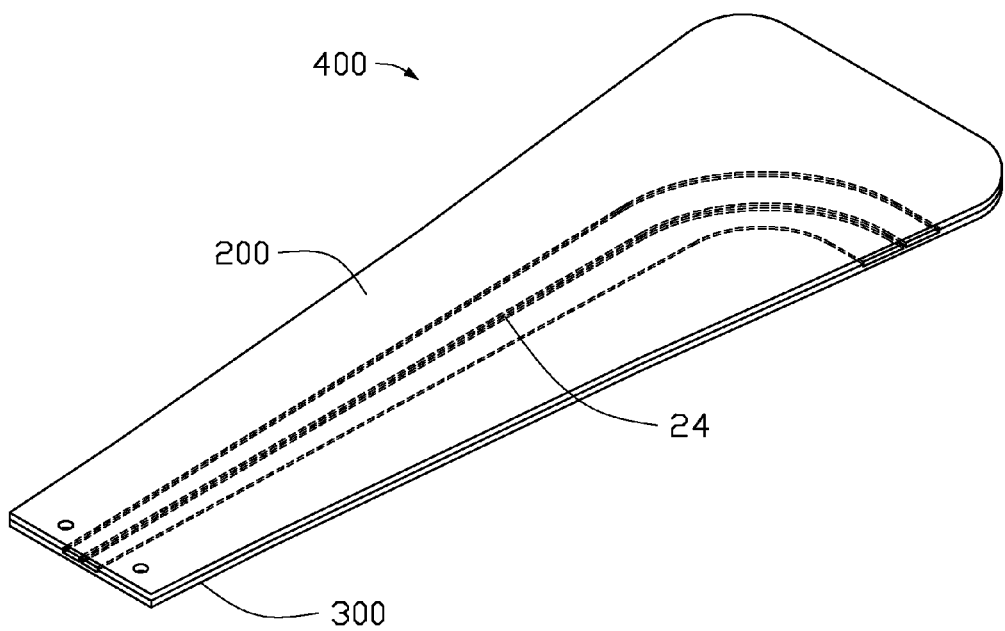
FIG. 4 is an isometric view of the first embodiment of a composite plate.

FIGS. 2-4 illustrate that a processing method for the manufacturing of the support 20 includes the following.

In step one, providing a first metal plate 200 and a second metal plate 300, the first metal plate 200 and the second metal plate 300 can be made of aluminum, and a size and shape of the first and second metal plate 200, 300 can be the same.

In step two, a plurality of location holes 210 can be respectively defined on the corners and edges of the first metal plate 200 and a second metal plate 300. In the illustrated embodiment, each metal plate can have three location holes 210, and the diameter of each location hole 210 is 9 mm.

In step three, a first recess 220 can be defined on surface of the first metal plate 200, a second recess 310 can be defined on surface of the second metal plate 300, and the first and second recess 220, 310 can have the same size and shape.

In step four, the first metal plate 200 and a second metal plate 300 can be welded together, and define a composite plate 400, then the edge of the composite plate 400 can be properly removed. In this situation, the first recess 220 can be coupled to the second recess 310, and define the wire passage 24. The location holes 210 of the first metal plate 200 can communicate with the location holes 210 of the second metal plate 300.

In step five, the edges of the composite plate 400 can be processed into rounded corners.

In step six, the composite plate 400 can be processed into the support 20 through bending.

Figure 5:
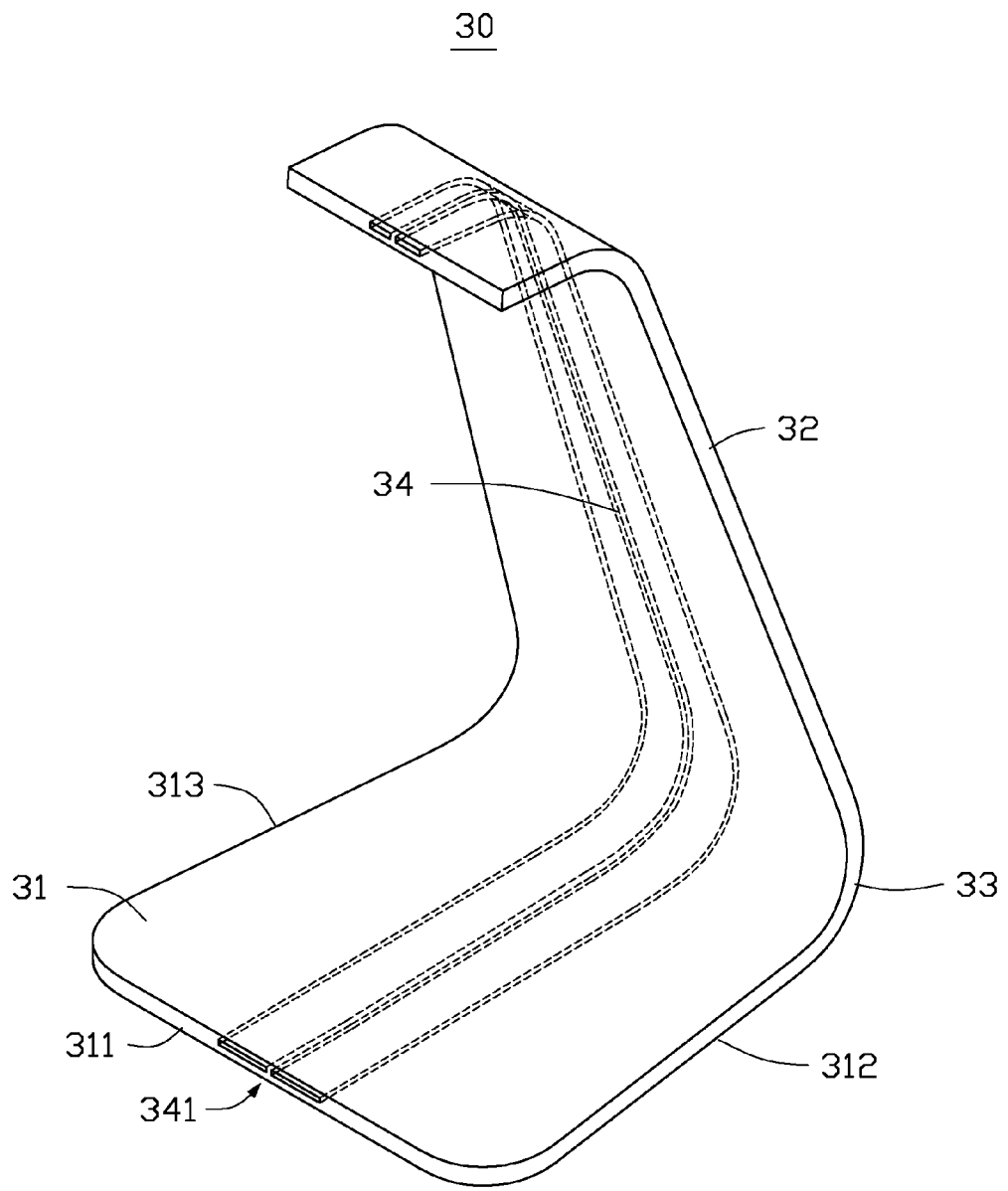
FIG. 5 is an isometric view of a second embodiment of a support.

FIG. 5 illustrates an isometric view of a second embodiment of a support 30. The support 30 can include a base portion 31, a stand portion 32, a first bent portion 33 between the base portion 31 and the stand portion 32, and a wire passage 34 defined through the base portion 31, the stand portion 32, and the first bent portion 33. The base portion 31 can include a first side wall 311 opposite to the first bent portion 33, a second side wall 312 and a third side wall 313 can be respectively symmetrical, and arranged between the first bent portion 33 and the first side wall 311. The wire passage 34 can be substantially straight, and the wire passage 34 can be perpendicular to the first side wall 311. A first opening 3111 can be defined on the center of the first side wall 311. In operation, the user can directly face the first opening 3111, so it is convenient to plug in or unplug storage devices.

Figure 6:
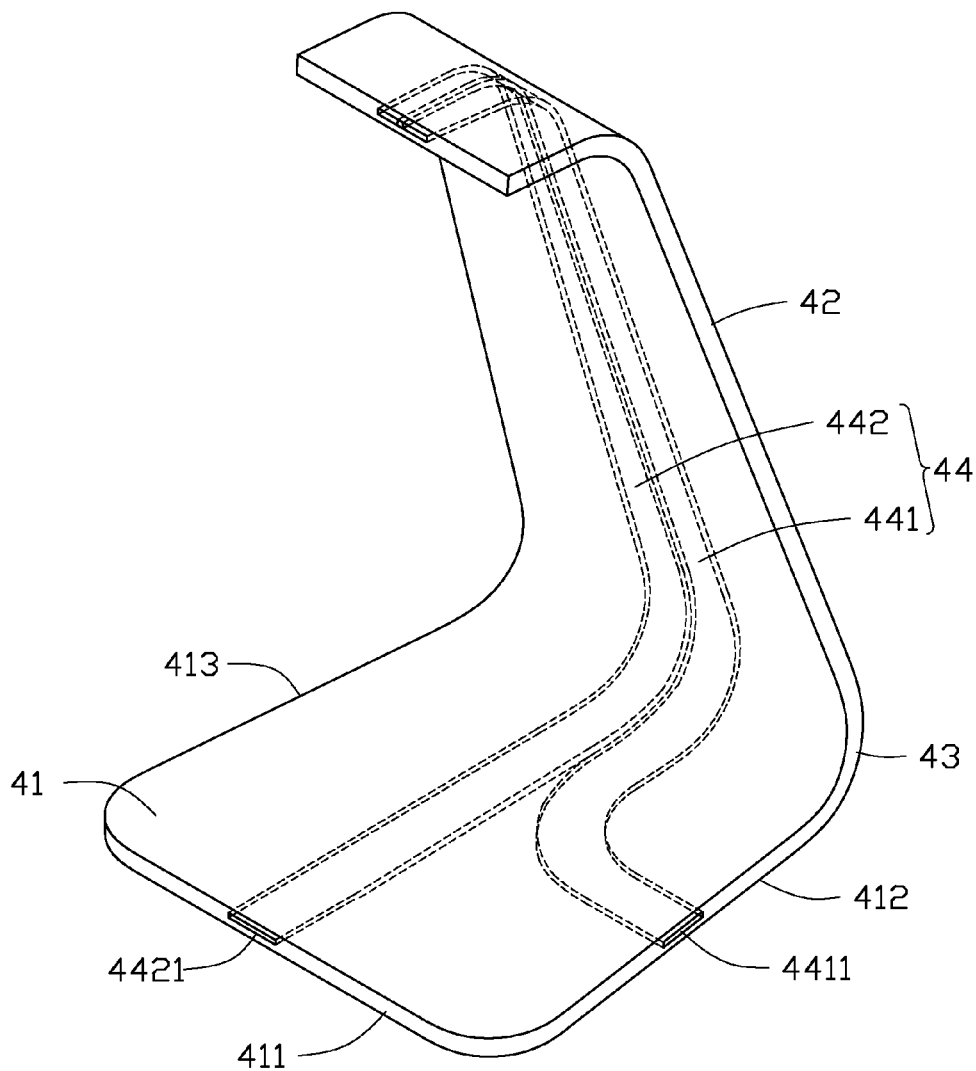
FIG. 6 is an isometric view of a third embodiment of a support.

FIG. 6 illustrates an isometric view of a second embodiment of a support 40. The support 40 can include a base portion 41, a stand portion 42, a first bent portion 43 between the base portion 41 and the stand portion 42. A wire passage 44 is defined through the base portion 41, the stand portion 42, and the first bent portion 43. The base portion 41 can include a first side wall 411 opposite to the first bent portion 43, a second side wall 412 and a third side wall 413 can be respectively symmetrical, and arranged between the first bent portion 43 and the first side wall 411. The wire passage 44 can include a first current slot 441 and a second current slot 442. The first current slot 441 can be substantially L-shaped in the base portion 41. The first current slot 441 can be connected to the second side wall 412, and define a first portion 4411. The second current slot 442 can be substantially straight in the base portion 41, and perpendicular to the first bent portion 43. The second current slot 442 can be connected to the first side wall 411, and define a second portion 4421. In at least one embodiment, the first portion 4411 can also be defined on the third side wall 413, and the second portion 4421 can also be defined on the second side wall 412 or third side wall 413.

The first portion 4411 can be defined on the second side wall 412 or the third side wall 413, which can avoid an electric shock hazard to the user. The second portion 4421 can be defined on first side wall 411, so it is convenient to plug in or unplug out the storage devices.

The embodiments shown and described above are only examples. Many details are often found in the art such as the other features of a support and a display device using the support. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A support for display device, and the support comprising:
   a base portion,
   a stand portion coupled to the base portion, and
   a first bent portion between the base portion and the stand portion;
   wherein, a wire passage passes through the base portion, the stand portion, and the first bent portion; and
   wherein, the wire passage is connected to an edge of the base portion, and defines a first opening; and
   wherein the base, the stand portion, and the first bent portion are made of a composite plate by bending, and the composite plate comprises a first metal plate and a second metal plate, the first metal plate comprises a first recess defined thereon, the second metal plate comprises a second recess defined thereon, and the wire passage is structured by the incorporation of the first recess and the second recess.

2. The support as claimed in claim 1, wherein the stand portion includes a supporting arm connected to the first bent portion, a fastening portion, and a second bent portion between the supporting arm and the fastening portion.

3. The support as claimed in claim 2, wherein the wire passage is straight in the supporting arm, the wire passage is connected to the fastening portion, and defines a second opening coupled to the first opening.

4. The support as claimed in claim 1, wherein the base portion comprises a first side wall opposite to the first bent portion, a second side wall, and a third side wall, the second side wall and a third side wall are symmetrical, and arranged between the first bent portion and the first side wall.

5. The support as claimed in claim 4, wherein the wire passage comprises a first current slot and a second current slot separated from the first current slot by a partition plate.

6. The support as claimed in claim 5, wherein the wire passage is L-shaped in the base portion, and the first opening is defined on the second side wall or the third side wall.

7. The support as claimed in claim 5, wherein the wire passage is straight in the base portion, and the first opening is defined on the first side wall.

8. The support as claimed in claim 5, wherein the first current slot is L-shaped in the base portion, and connected to the second side wall or the third side wall.

9. The support as claimed in claim 8, wherein the second current slot is straight in the base portion, perpendicular to the first bent portion, and connected to the first side wall.

10. A display device comprising:
a main body; and
a support configured to support the main body including
a base portion,
a stand portion coupled to the base portion, and
a first bent portion between the base portion and the stand portion;
wherein, a wire passage passes through the base portion, the stand portion, and the first bent portion; and
wherein, the wire passage is connected to an edge of the base portion, and defines a first opening; and
wherein the base, the stand portion, and the first bent portion are made of a composite plate by bending, and the composite plate comprises a first metal plate and a second metal plate, the first metal plate comprises a first recess defined thereon, the second metal plate comprises a second recess defined thereon, and the wire passage is structured by the incorporation of the first recess and the second recess.

11. The display device as claimed in claim 10, wherein the stand portion includes a supporting arm connected to the first bent portion, a fastening portion, a second bent portion between the supporting arm and the fastening portion.

12. The display device as claimed in claim 11, wherein the fastening portion comprises a fastening end away from the second bent portion, and the main body 10 is connected to the fastening end.

13. The display device as claimed in claim 11, wherein the wire passage is straight in the supporting arm, the wire passage is connected to the fastening end, and defines a second opening coupled to the first opening.

14. The display device as claimed in claim 10, wherein the base portion comprises a first side wall opposite to the first bent portion, a second side wall, and a third side wall, the second side wall and a third side wall are symmetrical, and arranged between the first bent portion and the first side wall.

15. The display device as claimed in claim 14, wherein the wire passage comprises a first current slot and a second current slot separated from the first current slot by a partition plate.

16. The display device as claimed in claim 15, wherein the wire passage is L-shaped in the base portion, and the first opening is defined on the second side wall or the third side wall.

17. The display device as claimed in claim 15, wherein the wire passage is straight in the base portion, and the first opening is defined on the first side wall.

18. The display device as claimed in claim 15, wherein the first current slot is L-shaped in the base portion, and connected to the second side wall or the third side wall.

19. The display device as claimed in claim 18, wherein the second current slot is straight in the base portion, perpendicular to the first bent portion, and connected to the first side wall.

* * * * *